United States Patent

Le Blanc, Sr.

[15] 3,648,323
[45] Mar. 14, 1972

[54] WINDSHIELD WIPER ASSEMBLY

[72] Inventor: Leo J. Le Blanc, Sr., 1116 Cypress Lake Drive, Fort Myers, Fla. 33092

[22] Filed: Dec. 28, 1970

[21] Appl. No.: 101,833

[52] U.S. Cl. ..................................................15/250.22
[51] Int. Cl. ..................................................B60s 1/44
[58] Field of Search ...........15/250.22, 250.16, 250.2, 250.3, 15/250.34

[56] References Cited

UNITED STATES PATENTS

| | | | |
|---|---|---|---|
| 2,125,154 | 7/1938 | Dillon | 15/250.22 x |
| 2,268,253 | 12/1941 | Hill et al. | 15/250.22 X |
| 2,351,699 | 6/1944 | Parry et al. | 15/250.22 X |
| 2,634,447 | 4/1953 | Domek et al. | 15/250.22 |
| 3,050,765 | 8/1962 | Eichler | 15/250.22 |

*Primary Examiner*—Peter Feldman
*Attorney*—Clarence A. O'Brien and Harvey B. Jacobson

[57] ABSTRACT

A windshield wiper arm assembly oscillatably supported from a marginal edge portion of a windshield for angular displacement of approximately 90° between a retracted position closely adjacent and generally paralleling the windshield marginal edge portion and an extended position projecting inwardly of the marginal edge portion with the arm overlying the windshield glass. A first motor assembly is provided for selectively swinging the support arm between its retracted and extended operative position and a rotary blade equipped wiper head is journaled from the free end of the support arm. A second motor assembly is provided and drivingly coupled to the rotary head through a drive shaft journaled through the support arm and is operative to rotate the blade equipped head when the support arm is in its extended operative position. Also, the rotary head is provided with at least one generally radially extending blade which may be positioned in closely adjacent parallel relation to the support arm when the latter is being swung toward and is disposed in its retracted position generally paralleling and closely adjacent the aforementioned marginal edge portion of the associated windshield assembly.

11 Claims, 10 Drawing Figures

PATENTED MAR 14 1972 3,648,323

Leo J. LeBlanc, Sr.
INVENTOR.

BY Clarence A. O'Brien
and Harvey B. Jacobson
Attorneys

Leo J. LeBlanc, Sr.
INVENTOR.

BY *Clarence A. O'Brien*
*and Harvey B. Jacobson*
Attorneys

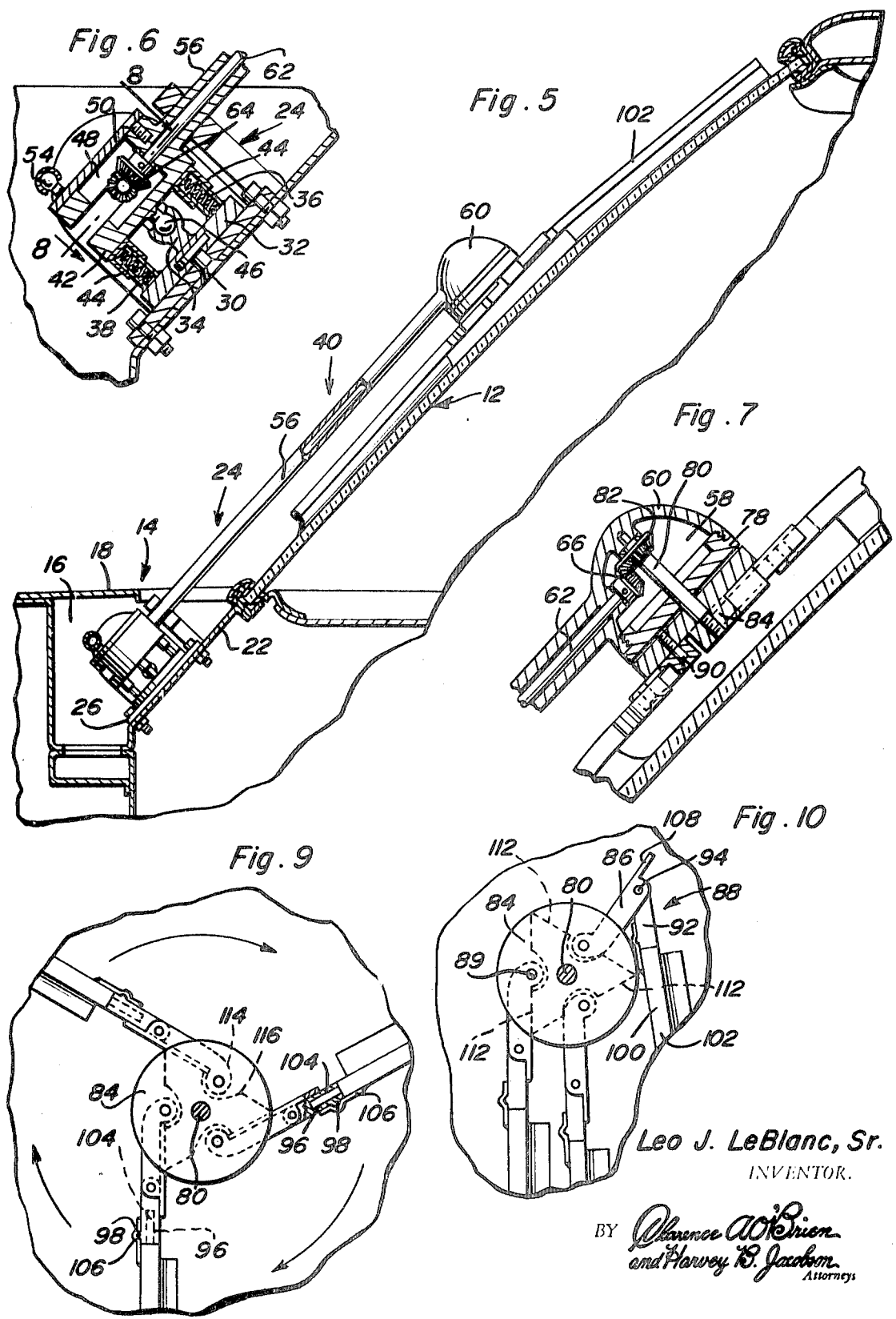

3,648,323

WINDSHIELD WIPER ASSEMBLY

The windshield wiper assembly of the instant invention has been specifically designed for use on vehicle windshields. However, the assembly may also be utilized in conjunction with vehicle rear windows and also in conjunction with other window constructions of various types.

Windshield wipers of the oscillatory type can be powered so as to complete two cycles of oscillation in a relatively short period of time. However, oscillatory windshield wipers, when driven at high speed, place undue stress on the driving components thereof and are noisey. Further, there is a practical limit as to how fast oscillatory windshield wipers may be driven and inasmuch as substantially all forms of oscillatory windshield wipers are constructed so that they move in a lateral direction toward at least one marginal edge portion of a windshield there is a constant problem, during snowy weather, wherein oscillatory windshield wiper blades tend to pile up snow between the blades and the windshield marginal edge portion to which they are laterally advanced. This pile up of snow can sometimes cause the windshield wipers to stall and the driver of the associated vehicle not only at least temporarily has his vision of the road ahead impaired, but irreparable damage can be incurred by the windshield wiper driving motor or drive train.

It is accordingly the main object of this invention to provide a windshield wiper assembly which may be driven at substantially any feasible speed so as to insure that at least the wiper blade swept portion of the windshield will be cleared of rain even in the heaviest downpour.

Another object of this invention is to provide a rotary windshield wiper assembly wherein the driving of the wiper blade portions thereof at high speed may be accomplished smoothly, without vibration and without undue stresses on the drive train of the wiper assembly.

Yet another object of this invention is to provide a rotary windshield wiper assembly in order that the wiper blade portions thereof may swing about an axis centrally disposed between two opposite marginal edge portions of the windshield and thereby preclude the wiper blades from moving laterally toward any windshield marginal portion while in close proximity thereto.

Still another object of this invention is to provide a rotary windshield wiper assembly constructed in a manner whereby it may be readily fully retracted into a recessed position within an adjacent cowl portion of the associated vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 5 is a fragmentary enlarged longitudinal vertical sectional view taken substantially upon a plane extending along one of the retractable arm assemblies of the windshield wiper assembly;

FIG. 6 is a fragmentary enlarged vertical sectional view taken substantially upon a plane passing along the section line 6—6 of FIG. 3;

FIG. 7 is a fragmentary enlarged vertical sectional view taken substantially upon a plane passing through the rotary head portion and the adjacent free end of one of the arms of the wiper assembly;

FIG. 9 is a plan view of one of the rotary heads of the windshield wiper assembly with the blade portions thereof in extended position; and FIG. 10 is a view similar to FIG. 9 but with the blade portions disposed in a collapsed position preparatory to swinging movement of the associated wiper arm to a fully retracted position within the cowl portion of the vehicle.

Figure 1:
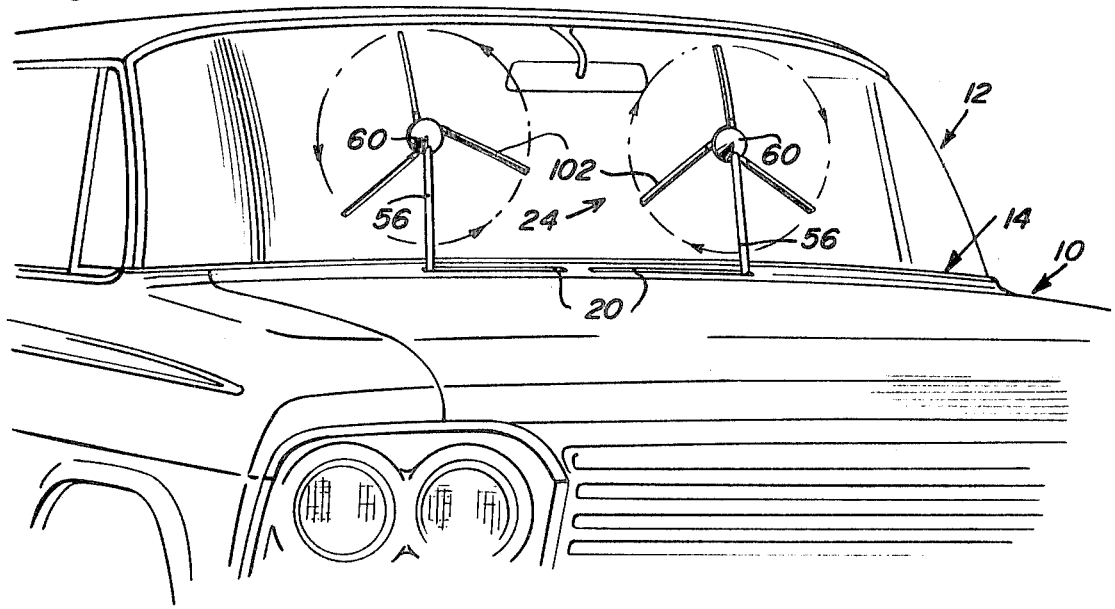
FIG. 1 is a fragmentary perspective view of the front end of a conventional form of motor vehicle equipped with the windshield wiper assembly of the instant invention.

Referring now more specifically to the drawings, the numeral 10 generally designates a conventional form of motor vehicle. The motor vehicle 10 includes a windshield assembly referred to in general by the reference numeral 12 disposed immediately rearwardly of and extending rearwardly and upwardly from a cowl assembly of the vehicle referred to in general by the reference numeral 14. The cowl assembly 14 defines a transversely extending well 16 and the upper wall 18 of the well 16 is provided with a pair of longitudinally extending slots 20.

The cowl 14 additionally includes a longitudinally extending rearwardly and upwardly inclined rear wall 22 and the wiper assembly of the instant invention is referred to in general by the reference numeral 24.

The wiper assembly 24 includes a pair of wiper arm mounting brackets 26 secured to the rear wall 22 in any convenient manner such as by fasteners 28 and each of the mounting brackets 26 includes a rivet-type pivot fastener 30 secured therethrough and also secured through the rear wall 22 by which a mounting plate 32 is mounted on the mounting bracket 26. The mounting plate 32 includes an outstanding socket element 34 and a plurality of outstanding sleeves 36 spaced about the socket element 34. A compression spring 38 is seated in each sleeve 36 and projects slightly outwardly therefrom and a pair of wiper arms referred to in general by the reference numeral 40 include enlarged cylindrical base ends 42 including outstanding sleeves 44 telescoped over the free ends of the sleeves 36 and in which the outer ends of the compression springs 38 seat. The base ends 42 include outstanding ball elements 46 which are captively and swivelly supported in the corresponding socket elements 34 and accordingly, each base 42 is swivelly supported from the corresponding mounting plate and yieldingly biased toward a rest position by means of the compression springs 38.

Each of the base ends 42 defines an outwardly opening recess 48 whose open outer side is covered and closed by a cover plate 50 secured to the corresponding base end 42 by means of removable fasteners 52. In addition, each of the cover plates 50 includes an outstanding ball element 54 for a purpose to be hereinafter more fully set forth.

Each of the wiper arms 40 includes a tubular arm portion 56 and the base end of each tubular arm portion 56 opens into the corresponding recess 48 while the free end of each arm portion 56 opens into a laterally outwardly opening recess 58 formed in a head 60 carried by the free end of each arm portion 56.

A drive shaft 62 is journaled through each tubular arm portion 56 and includes a first bevel gear 64 on its end disposed in the recess 48 and a second bevel gear 66 disposed on the end projecting into the recess 58.

The windshield wiper assembly 24 further includes a pair of electric motors 68 secured to the rear wall 22 by means of fasteners 70 and each electric motor 68 includes a rotary output shaft 72 which projects through a slot 74 provided therefor in the corresponding base end 42 and extending slightly more than 90° about an axis extending through the corresponding socket and ball elements 34 and 46 and intersecting with the axis of rotation of the corresponding drive shaft 62. The free end of each shaft 72 has a bevel gear 76 mounted thereon with which the corresponding bevel gear 64 is meshed when the wiper arms 40 are disposed in their operative positions thereof illustrated in FIGS. 1, 2 and 5 of the drawings.

Each of the heads 60 is provided with a cover plate 78 threadedly engaged in the open end of the head and closing the corresponding recess 58. In addition, each of the heads has a wiper head shaft 80 journaled through its cover plate 78 and in the wall portion of the head remote from the cover plate 78 and each wiper head shaft 80 has a bevel gear 82 mounted on its inner end meshed with the corresponding bevel gear 66.

A wiper blade support head 84 is threadedly engaged on the outer end of each wiper head shaft 80 and has the base end sections 86 of three wiper blade arms referred to in general by the reference numerals 88 pivotally secured thereto as at 90. The blade arms include articulated free end sections 92 oscillatably supported therefrom as at 94 and the free swinging ends of the end sections 92 include blind bores 96 and laterally projecting detent projections 98 by which the base ends 100 of three wiper blades 102 are removably secured to the end sections 92, the base ends of the wiper blades 102 including shank portions 104 receivable in the blind bores 96 and spring clips 106 releasably engageable with the detent projections 98.

It may be seen from a comparison of FIGS. 9 and 10 of the drawings that the base end sections 86 include abutment tongues 108 whereby the corresponding end sections 92 may be swung through arcs of approximately 135° relative to the base end sections 86 from the operative positions thereof illustrated in FIG. 9 of the drawings to the variously collapsed positions thereof illustrated in FIG. 10 of the drawings, the extreme right-hand end section 92 being angularly displaced approximately 135° relative to its base end section 86 in FIG. 10. In addition, from a comparison of FIGS. 9 and 10 of the drawings it may be seen that the head 84 includes three abutment surfaces 112 limiting swinging movement of the base end sections 86 relative thereto in one direction and that the base end sections 86 and head 84 include coacting surfaces 114 and 116 limiting swinging movement of the base end sections 86 relative to the head 84 in the other direction.

The windshield wiper assembly 24 further includes a main motor referred to in general by the reference numeral 118 supported from the rear wall 22 in any convenient manner such as by fasteners 120. The main motor 118 includes a rotary output shaft 122 upon which an eccentrically mounted pivot 124 is carried. A pair of connecting rods 126 are provided and corresponding ends of the connecting rods 126 are journaled from the eccentric pivot 124 while the other pair of corresponding ends of the connecting rods 126 are journaled from the ball elements 54 carried by the base ends 42 of the wiper arms 40. Further, cam and stop brackets 128 are carried by the rear wall 22 and define outwardly opening cam slots 130 into which the base ends of the tubular arm portions 56 are swingable as the wiper arms 40 are swung to the operative positions thereof illustrated in FIGS. 1, 2 and 5 of the drawings. The cam slots 130 have a camming action on the base ends of the wiper arms 40 and tend to bias the free ends of the wiper arms 40 toward the windshield assembly 12 as the wiper arms 40 complete their movement to their operative positions.

Figure 2:
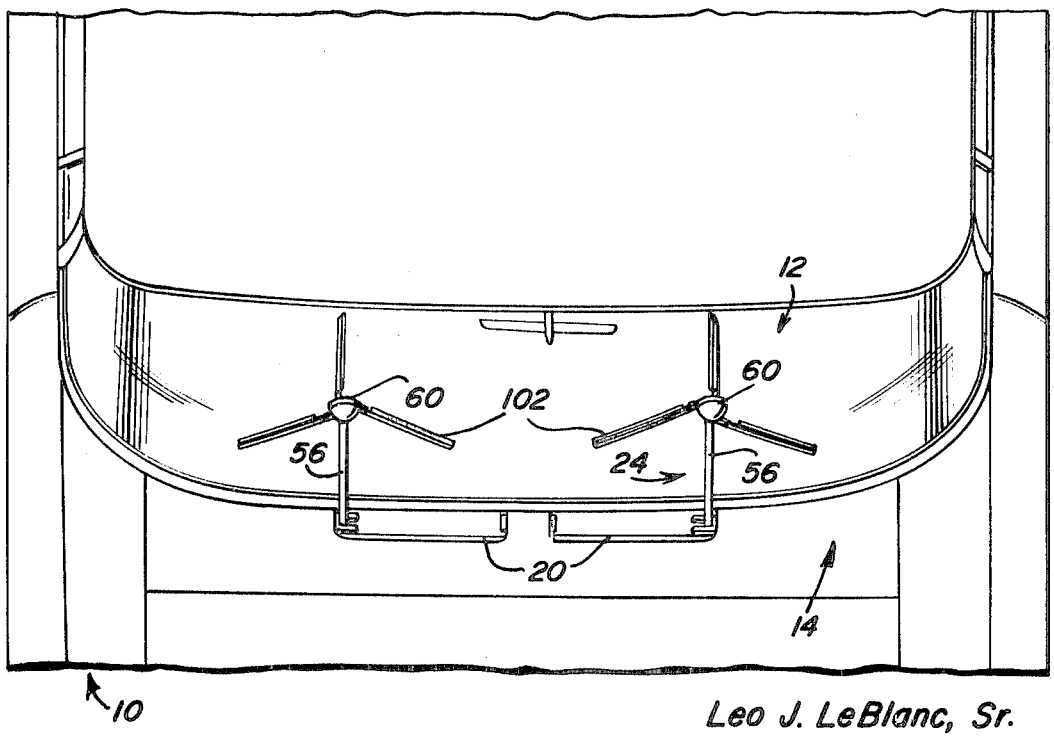
FIG. 2 is a fragmentary top plan view of the windshield area of the vehicle illustrated in FIG. 1 and with the wiper assembly positioned in operative association with the windshield.
Figure 3:
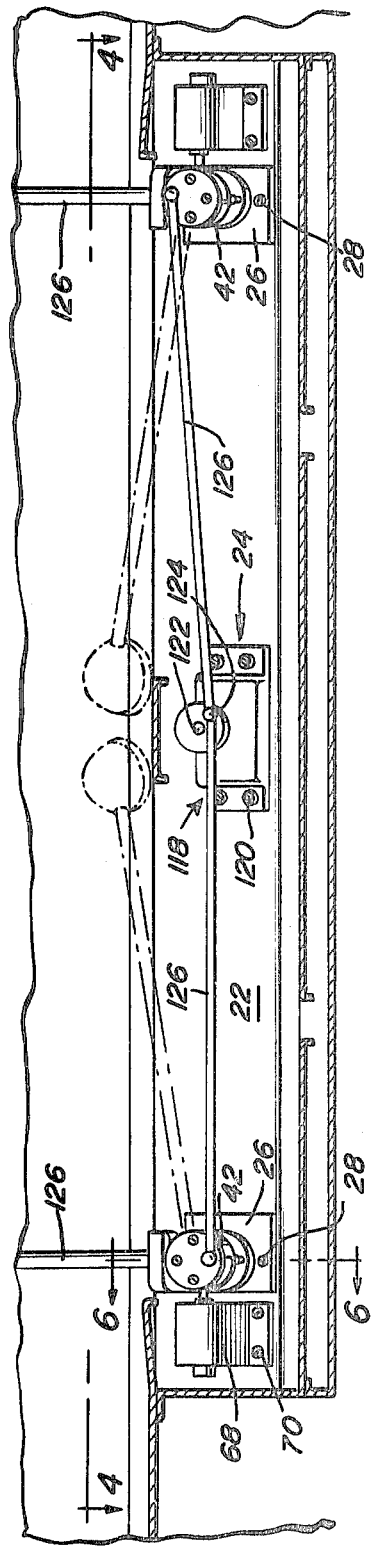
FIG. 3 is a fragmentary enlarged transverse vertical sectional view taken substantially upon a plane passing through the cowl portion of the vehicle and looking in a rearward direction.
Figure 4:
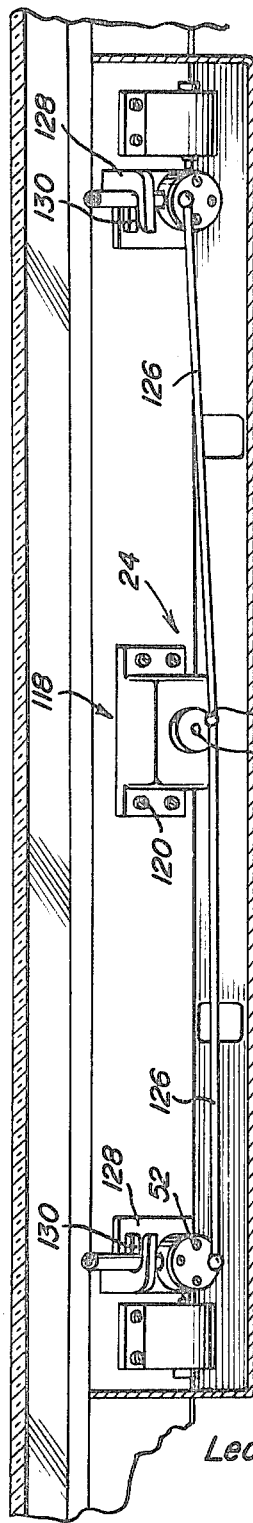
FIG. 4 is a fragmentary horizontal sectional view taken substantially upon the plane indicated by the section line 4—4 of FIG. 3.
Figure 8:
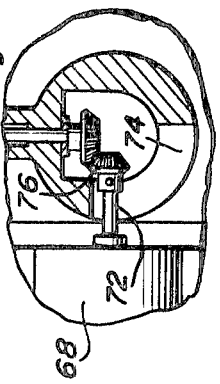
FIG. 8 is a fragmentary sectional view taken substantially upon the plane indicated by the section line 8—8 of FIG. 6.

From a comparison of the solid and phantom line positions of the wiper arms 40 in FIG. 3 of the drawings and also FIG. 4 of the drawings, it may be appreciated that the motor 118 may be actuated so as to swing the wiper arms 40 from the collapsed retracted positions illustrated in phantom lines in FIG. 4 of the drawings to the fully extended positions thereof illustrated in FIGS. 3 and 4 of the drawings as well as FIGS. 1, 2 and 5 of the drawings. As the wiper arms 40 are swung toward their operative positions, the bevel gears 64 are swung into meshed engagement with the bevel gears 76 whereby the electric motors 80 may drive the drive shafts 82 and thus the wiper head shafts and wiper blade shaft head. Of course, as indicated by the arrows in FIG. 9, the wiper heads rotate in clockwise directions as viewed from the interior of the vehicle 10 and thus the blade arms 88 are swung from the retracted positions thereof illustrated in FIG. 10 of the drawings to the extended positions thereof illustrated in FIG. 9 of the drawings as soon as the wiper blade shaft heads 84 are placed in motion by the electric motors 86. Further, it will be noted that as soon as the wiper arms 40 have been swung partially from their extended positions to their retracted positions the bevel gears 64 are swung out of engagement with the bevel gears 76 thereby enabling the wiper blade shaft heads 84 to freewheel. Assuming that the wiper blade shaft head 84 illustrated in FIG. 9 is stationary and that it will be swung to the left and downwardly as the corresponding wiper arm 40 is swung to the retracted position, the wiper blades 102, by their frictional engagement with the windshield assembly 12, will be swung substantially to the positions thereof illustrated in FIG. 10 of the drawings as the free end of the wiper arm 40 is swung toward its retracted position. Of course, inasmuch as the wiper blade shaft heads 84 are freewheeling as soon as the wiper arms 40 have been swung partially toward their closed positions, if any rotation of the wiper blade shaft heads 84 is necessary in order to position the wiper blades 102 in the compact positions thereof illustrated in FIG. 10 during movement of the corresponding wiper arm to its fully retracted position, the wiper blade shaft head 84 is free to rotate.

In operation, the electric motor 118 is initially actuated to swing the wiper arms 40 from the phantom line retracted positions thereof illustrated in FIG. 3 of the drawings to the solid line extended positions thereof illustrated in FIGS. 1–5 of the drawings. Then, with the bevel gears 64 meshed with the bevel gears 78, the electric motors 68 may be actuated in order to cause rotation of the wiper blade shaft heads 84. Of course, the heads 84 may be driven at any reasonable speed so as to provide maximum vision to the driver of the vehicle 10 even when he is driving in a heavy rain.

Of course, as the wiper arms 40 are swung toward their fully retracted position, they are received downwardly into the well 16 through the slots 20 and the well 16 may be provided with any suitable drain openings for draining melted snow or rain water therefrom.

Further, the motors 118 and 68 may be controllably interconnected by a suitable control circuit whereby initial actuation of the motor 118 will swing the wiper arms 40 to the fully extended operative positions thereof and then automatically deactuate the motor 118 while simultaneously actuating the motor 68. Further, when it is desired to turn off the windshield wiper assembly 24, actuation of a single control may simultaneously terminate operation of the motor 68 and then actuate the motor 118 for swinging the wiper arms 40 to the fully retracted positions thereof before automatically terminating operation of the electric motor 118 as the wiper arms 40 are swung toward their fully collapsed positions.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention.

What is claimed as new is as follows:

1. A windshield wiper assembly comprising a wiper arm having base and free ends, a rotary head journaled from said free end and including generally radially outwardly extending elongated wiper blade portions, a rotary drive shaft journaled from and extending longitudinally of said arm and having its end adjacent said head drivingly coupled thereto, a first drive wheel carried by the other end of said drive shaft, a support, means mounting the base end of said arm from said support for oscillation about an axis extending transversely of said arm, a driven shaft journaled from said support and having a driven wheel mounted thereon, said arm being oscillatable about said axis between a first retracted position and a second extended operational position, said drive wheel, upon movement of said arm from said first position to said second position, being swung from an inoperative position out of drive connection with said driven wheel to an operative position with said drive wheel engaged with and drivingly coupled to said drive wheel.

2. The combination of claim 1 wherein said head and the radial innermost ends of said blade portions include means swingably supporting said block portions from said head for swinging movement toward inoperative positions generally paralleling and disposed alongside the free end of said arm.

3. The combination of claim 1 wherein said support is adapted for securement to a vehicle body portion adjacent one marginal edge portion of a window of said vehicle, the first mentioned means including means swively mounting said base end from said support and bias means yieldingly biasing said base end toward a predetermined rest position of swivel adjustment independent of displacement of said base end about its axis of oscillation relative to said support.

4. The combination of claim 3 wherein said arm and support include means operative to cam said arm in a predetermined lateral direction against the action of said bias means as said arm completes its movement toward said second position.

5. The combination of claim 1 wherein said support is adapted for securement to a vehicle body portion adjacent one marginal edge portion of a window of said vehicle, the first mentioned means including means swively mounting said base end from said support and bias means yieldingly biasing said base end toward a predetermined rest position of swivel adjustment independent of displacement of said base end about its axis of oscillation relative to said support, motor means drivingly connected between said support and said arm for swinging the latter between said first and second positions.

6. A windshield wiper assembly comprising a wiper arm having base and free ends, a rotary head journaled from said free end and including generally radially outwardly extending elongated wiper blade portions spaced thereabout, a support, means mounting the base end of said arm on said support for oscillation about an axis extending transversely of said arm, the inner ends of said blade portions including short elongated articulated segments pivotally secured at one set of corresponding ends to said head and to said blade portions at the other set of corresponding ends, said articulated segments being sufficient in length to allow all of said blade portions to swing toward positions closely adjacent and in side-by-side relation with the free end portion of said arm.

7. The combination of claim 6 wherein said support is adapted for securement to a vehicle body portion adjacent one marginal edge portion of a window of said vehicle, the first mentioned means including means swively mounting said base end from said support and bias means yieldingly biasing said base end toward a predetermined rest position of swivel adjustment independent of displacement of said base end about its axis of oscillation relative to said support.

8. The combination of claim 7 wherein said arm and support include means operative to cam said arm in a predetermined lateral direction against the action of said bias means as said arm completes its movement toward said second position.

9. The combination of claim 1 wherein the inner ends of said blade portions include short elongated articulated segments pivotally secured at one set of corresponding ends to said head and to said blade portions at the other set of corresponding ends, said articulated segments being sufficient in length to allow all of said blade portions to swing toward positions closely adjacent and in side-by-side relation with the free end portion of said arm.

10. A windshield wiper assembly comprising a wiper arm having base and free ends, blade means carried by said free end, a support, means mounting the base end of said arm from said support for oscillation about an axis extending transversely of said arm, said support being adapted for securement to a vehicle body portion adjacent one marginal edge portion of a window of said vehicle, the first mentioned means including means swively mounting said base end from said support and bias means yieldingly biasing said base end toward a predetermined rest position of swivel adjustment independent of displacement of said base end about its axis of oscillation relative to said support.

11. The combination of claim 10 wherein said arm and support include means operative to cam said arm in a predetermined lateral direction generally paralleling said axis against the action of said bias means as said arm is moved toward one limit position of oscillation.

* * * * *